Patented Apr. 23, 1946

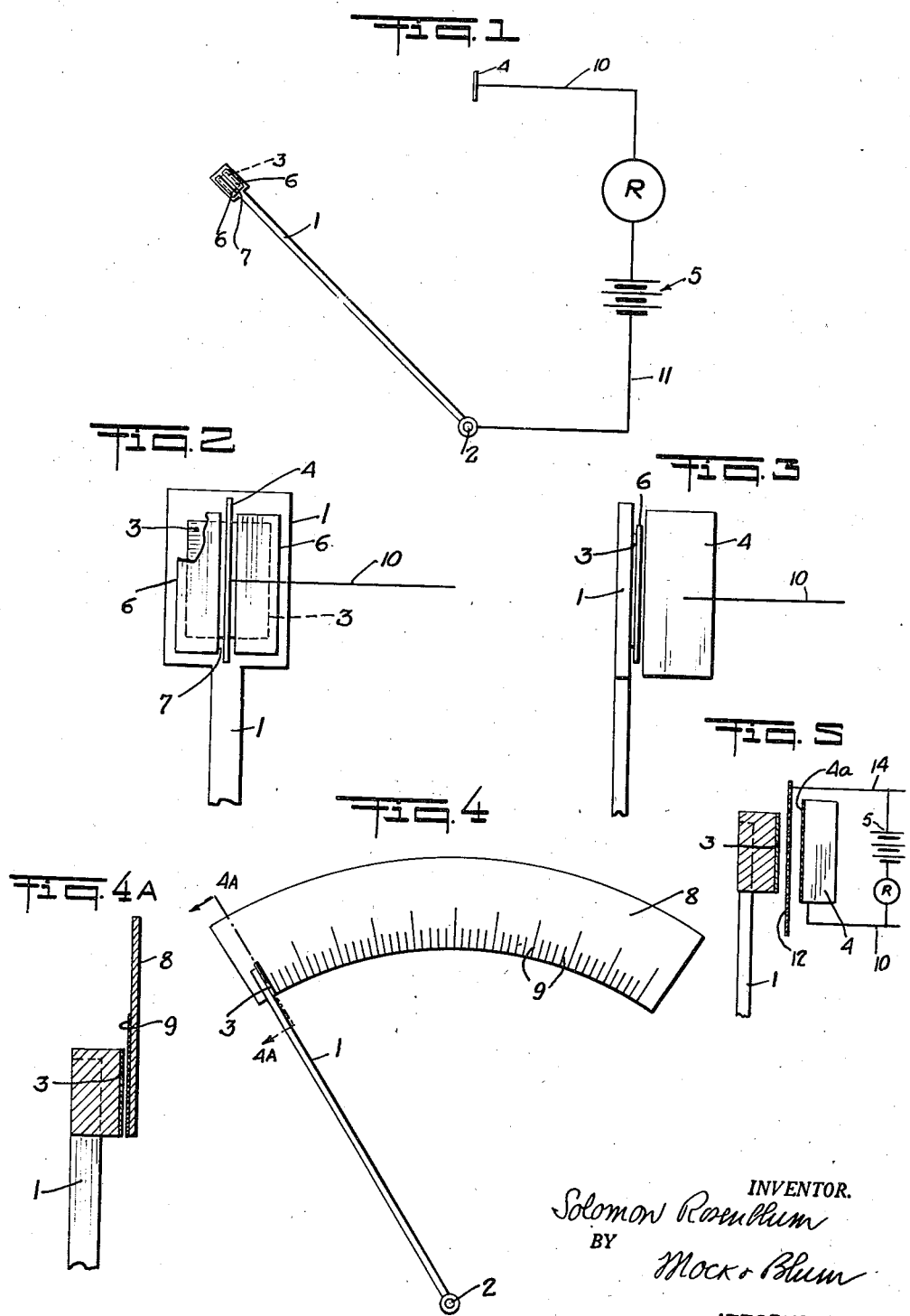

2,399,061

UNITED STATES PATENT OFFICE 2,399,061

SWITCH

Solomon Rosenblum, Princeton, N. J., assignor to Canadian Radium & Uranium Corporation, New York, N. Y., a corporation of New York Application May 3, 1943, Serial No. 485,440

7 Claims. (Cl. 315—76)

My invention relates to a new and improved switch and to a new and improved indicating device, which includes a mass of radio-active material.

One of the objects of my invention is to provide a switch which has a movable member which can be moved to circuit-closing position, without contacting said movable member with the respective current-terminal, the circuit being closed through the ionized dielectric of a gap, said dielectric being ionized preferably by radio-active material.

Another object is to provide a movable indicator for indicating the amperage or voltage of an electric current or to indicate any other phenomenon, said movable indicator having a mass of radio-active material connected thereto.

Other objects of the invention will be stated in the annexed description and diagrammatic drawing, which illustrate preferred embodiments thereof.

Fig. 1 illustrates a switch which has a pivoted arm, to which a mass of radio-active material is connected.

Fig. 2 is a detail view of the free end-part of the pivoted arm of Fig. 1, and of the switch-terminal.

Fig. 3 is a detail side elevation, showing the pivoted arm of Fig. 2 in its circuit-closing position.

Fig. 4 shows the invention applied to the movable pointer of any device for measuring the amperage or voltage of an electric current, or for indicating any other phenomenon.

Fig. 4A is a section on 4A—4A of Fig. 4.

Fig. 5 is a view similar to 4A, of another embodiment.

The invention is particularly intended for use in indicating the movement of a part under very slight actuating force, such as the movement of the movable part of an electrometer, a torsion galvanometer, etc.

The ordinary switch, in which a movable member must physically contact with a switch-terminal in order to close a circuit, requires a larger actuating force than the slight force above mentioned.

According to my invention, a very small mass of radio-active material is fixed to the movable member of a switch or to the movable member of a scale-device or other indicating device, and said mass of radio-active material completes the circuit by ionizing the dielectric of a gap between said movable member and its terminal according to one embodiment, when said movable member and said terminal are accurately in predetermined relative position.

Fig. 1 shows a battery 5, one of whose poles is connected through element R and wire 10, to switch-terminal 4. This switch-terminal 4 may be fixed. It is either very narrow, or it has a very narrow edge at the gap which contains the dielectric which is to be ionized when the pivoted arm 1 is in predetermined circuit-closing position relative to terminal 4. The element R may be the coil of a relay, or any electrically operated device. When I state that element 4 is very narrow, I refer to its dimension in a plane which is parallel to the plane in which member 1 is moved.

The other pole of battery 5 is connected by wire 11 to the pivot 2 of the metal switch-arm 1. The arm 1 turns in the plane of Fig. 1. The arm 1 has a head or free end, upon which a thin layer 3 of radio-active material is fixed. This radio-active material produces alpha rays, which can ionize the dielectric in the gap between the head of arm 1 and switch-terminal 4, when said arm 1 is accurately in predetermined angular position.

The layer 3 may be very narrow, in a plane which is parallel to the plane in which the arm 1 turns. The switch-terminal 4 or its gap-edge, may also be very narrow in a direction parallel to said plane, so that layer 3 and the gap-edge of terminal 4 will register in circuit-closing relation, only when arm 1 is accurately in predetermined angular position. There is always a gap between the head of element 1 and element 4, in a direction perpendicular to the plane of Fig. 1, when said head registers with element 4. Hence the circuit-closing position of arm 1 can be made just as precise, or even more precise, as if it were necessary to provide physical contact between a narrow edge of arm 1 and a narrow edge of switch-terminal 4. In order to secure proper accuracy of registration, I can provide a mask 6 which covers the radio-active material, save at a narrow slit or opening or thin part 7. The range of the alpha particles of radio-active material is 3–9 cm. in air at ordianry atmospheric pressure, depending upon the kind of radio-active material. Said alpha particles travel in fairly straight lines. If the mask 6 is made of metal or other material which stops the alpha rays or reduces their range, the alpha rays are emitted only through the opening or slit 7. The same effect is secured if mask 6 is imperforate and it has a relatively thin part through which the alpha particles have sufficient range. The arm 1 may be biased in the well-known manner, to keep it out of circuit-closing position, namely, in the angular position of Fig. 1.

When the arm 1 is in the circuit-closing position of Figs. 2 and 3, the narrow opening or slit or thinned part 7 and the narrow edge of the terminal 4 are in registration and they are separated by an intermediate gap, in which the dielectric, namely, the air, is ionized in a sharply defined narrow zone, by the alpha rays which pass through slit 7. The circuit of battery 5 is closed through the ionized dielectric of the gap, thus energizing or operating element R, which may be a relay or any other electrical device. The depth of the gap, in a direction parallel to the plane of Fig. 3 and hence in a direction perpendicular to the plane of Fig. 1, may be very small. The applied voltage of battery 5 is insufficient to strike across said gap, unless the dielectric of said gap is ionized by the accurate registration of opening or slit 7 and the gap-edge of terminal 4. Hence, if arm 1 is turned clockwise from the circuit-opening position of Fig. 1 to the circuit-closing position of Figs. 2 and 3, further clockwise movement of arm 1 will break the circuit. That is, the gap between the terminals has a dielectric. The applied voltage is less than the breakdown voltage of said dielectric. The circuit is closed only through an ionization current, which depends upon the extraction of the ions by the electrodes.

The terminal 4 may be of substantial width in a plane which is parallel to the plane of movement of arm 1, like the element 8 of Fig. 4. In such case, the circuit is closed through the ionized dielectric of the gap, as soon as slit 7 registers with the switch-terminal 4 at one end of said switch terminal, and the circuit will remain closed if the arm 1 is moved beyond the initial circuit-closing position, until the radio-active material is moved out of registration with said terminal 4.

Fig. 4 shows a sector 8 which has a gap-face which is coated with fluorescent material. Said coated gap-face is provided with a scale which has scale-markings 9. There may be only a single indicating marking 9. The arm 1 is biased to turn counter-clockwise. When arm 1 is turned to register with said scale, the narrow strip of radio-active material will register with the respective marking 9, across the intermediate gap. A narrow luminous indicating line is thus produced by the radio-active material upon the fluorescent face of the sector, and said luminous line will accurately indicate the position of the arm 1, thus eliminating the error which is caused by parallax.

The depth of the gap need not be very small, because the range of the alpha particles may be as much as 9 cm., and the gap may thus have a width of as much as approximately 9 cm. However, a very small gap is preferred. The range of the alpha particles is 9 cm. in air at full normal atmospheric pressure of 760 mm. of mercury. The switch is therefore operable in air at full normal atmospheric pressure.

The scale markings 9 can be produced by scratching the fluorescent coating, or by means of dark pigment.

The member 8 of Fig. 4 can be substituted for the member 4 of Fig. 1. In such case, if the arm 1 is turned against its biasing force by the force which is exerted by the movable element of an electrometer, or by other slight actuating force, a relay will be operated as soon as arm 1 is in circuit-closing position. The arm 1 can be directly fixed to the movable element of an electrometer, or of a ballistic galvanometer or the like, so that the biasing force will be supplied by such movable element of the electrometer or other device. Fig. 1 shows the arm 1 spaced substantially from the circuit-closing position. However, the arm 1 may be stopped in an angular position which is just out of circuit-closing position, so that a very slight turning movement of arm 1 will be sufficient to close the circuit. The embodiment of Figs. 4 and 4A may also utilize a mask. The movable arm 1 may be pivoted or non-pivoted.

The current which flows through the ionized dielectric of the gap, when the circuit is closed, is ordinarily in the order of 0.1 microampere, when using one milligram of radium bromide. The current is much smaller than the breakdown current which results from the application of a breakdown voltage to the air or other gaseous dielectric. Such small current is sometimes designated as a "dark current," because it is not accompanied by a visible discharge. Such current is also sometimes designated as an ionization current, because it results wholly from the ionization of the gaseous dielectric which is produced by the radio-active material, without the emission of electrons from the cathode of the gap. I do not pass a breakdown current through the gap, when the circuit is closed. Hence, if a relay is used, it must be sufficiently sensitive to be actuated by such small ionization current. The battery 5 may be replaced by an alternator or by any source of electric current, as long as the maximum applied voltage is insufficient to strike across the gap, save at the ionized portion of the dielectric thereof.

I can use two or more spaced switch-terminals 4, so that the circuit will be closed successively through respective gaps between arm 1 and the respective terminals 4, when arm 1 is turned clockwise from its normal inoperative position. Each said terminal 4 can be provided with a respective relay. Hence, if arm 1 is turned through a substantial angle from its initial normal inoperative position, such angle will be indicated by the number of relays R which will be successively energized during said turning movement. Each relay can operate a marking or indicating device, through a respective local circuit which will be closed by the armature of the respective energized relay.

These conventional details are not illustrated as they are well-known per se.

The invention is not limited to mounting the radio-active material on the movable member of the electrometer or other device, or to a device in which one member, like the member 4 or the member 8, is held stationary. The radio-active material may be held and located in any manner, as long as it ionizes the dielectric of a gap between the two members of the device, when said two members are accurately in a single predetermined position, or between a predetermined range of positions. A very small and very light mass of radium or polonium or other radio-active material is sufficient. I include other sources of ionizing energy.

Likewise, the apparatus may be enclosed, and the filling of the gap may be any gas or vapor, at any pressure, which may be above or below atmospheric pressure. An increase in pressure diminishes the range of the alpha rays, and the range of the alpha rays also depends upon the atomic weight or molecular weight of the gaseous filling.

As a practical example, the width of slit 7 may be 2-3 millimeters, so that the circuit can be closed when the end of the arm 1 is moved from a position just in advance of the circuit-closing position through a linear distance which is equal to said width. Since the arm 1 can be made long, said arm can thus be turned from a position just in advance of the circuit-closing position to the circuit-closing position, through an extremely small angle. As an example, if the width of slit 7 is as above stated, the length of arm 1 from its pivot 2 up to slit 7, can be about 50 mm. The height of mask 6, in a direction parallel to the longitudinal axis of arm 1, may be 15 mm. The slit 7 may have a circular or any other shape, instead of the rectangular shape shown in Fig. 2, whose longitudinal axis coincides with the longitudinal axis of arm 1.

The arm 1 can be connected to the movable part of a ballistic galvanometer or other device, which may turn either clockwise or counter-clockwise from a normal position. Hence the invention is not limited to a device in which the arm 1 is turned only in one direction, either to close one or more circuits, or to move across a scale.

While I prefer to use radio-active material to ionize the gap, I can use other means. Since the radio-active material can be mounted upon one or more switch-terminals 4, which can be held stationary, the invention is not limited to a movable source of ionizing rays.

Numerous changes and omissions can be made, without departing from the scope of the invention.

For example, Fig. 5 shows the terminal 4 associated with a mesh terminal 12. Terminals 4 and 12 are held in fixed position. The screen or mesh terminal 12 is connected by wire 14 to one of the terminals of the battery, such as the plus terminal of said battery. The terminal 4 is connected to the negative terminal of said battery by wire 10. When the exposed part of the radio-active material 3 is in accurate registration with the thin edge 4a of member 4, the dielectric in the gap between the members 4 and 12 is ionized, thus closing the circuit of the battery and of any auxiliary part, such as a relay, etc. In the embodiment of Fig. 5, it is not necessary to conduct the current along arm 1, which may be made of conducting or non-conducting material.

In each of the switch embodiments, there are two switch-terminals. These switch-terminals are movable relative to each other in the embodiment of Figs. 1-4A, and said switch-terminals are fixed relative to each other in the embodiment of Fig. 5. In each switch-embodiment, a movable mass of radio-active material is moved to ionize the dielectric in the gap between the switch-terminals.

In the first embodiment, said mass of radio-active material is moved in unison with one of the switch-terminals. In the embodiment of Fig. 5, the mass of radio-active material is moved relative to both switch-terminals 4 and 12.

I claim:

1. In combination, a scale-body which has a coating of fluorescent material on a gap-surface of said scale-body, said gap-surface also having at least one indicating marking thereon, a movable body mounted to move across and spaced from said gap-surface to provide a gap between said gap-surface and a companion surface of said movable body, said companion surface having a mass of radio-active material which produces a fluorescent indicating glow-area on said coating.

2. A switch device for a source of current, said device comprising at least two switch members which are movable relative to each other, said switch members being respectively connected to the respective terminals of said source and being movable away from each other to circuit-opening relation and being movable towards each other to circuit-closing relation, said switch members being separated by a gap of predetermined width when said switch members are in final circuit-closing relation to close the circuit of said source, said gap having an ionizable gaseous medium therein, radio-active material located to ionize the gaseous medium in said gap, the voltage of said source being less than the breakdown voltage of the gaseous medium in said gap even when said gaseous medium is ionized by said radio-active material, so that said voltage is sufficiently low to prevent the passage of a breakdown current through the ionized gaseous medium in said gap when the circuit of said source is closed through said gap, said switch-members being non-movable to a position in which the distance between them is less than said predetermined width.

3. A switch device according to claim 2, in which said gaseous medium is air at the same pressure as the atmosphere which is external to said gap.

4. A switch device according to claim 2, in which said radio-active material is mounted on one of said switch-members, said radio-active material being located on said switch-member to emit its ionizing ray or rays into said gap.

5. A switch device according to claim 2, in which said radio-active material is mounted on one of said switch-members, said radio-active material being located on said switch-member to emit its ionizing ray or rays into said gap, said switch-member having a mask which blocks some of said ionizing ray or rays.

6. A switch device for a source of current, said switch device comprising two terminal members, said terminal members being respectively connected to the respective terminals of said source, said terminal members being held spaced from each other by a gap in which an ionizable gaseous medium is located so that the circuit of said source can be closed only through gaseous medium in said gap, a carrier which is movable to a circuit-closing position and to a circuit-opening position to close and to open the circuit of said source through said gaseous medium in said gap, said carrier having a mass of radio-active material thereon, said mass being located to ionize said gaseous medium in said gap only when said carrier is in said circuit-closing position, the circuit of said source being then closed through said gaseous medium when it is thus ionized, the voltage of said source being less than the breakdown voltage of said gaseous medium even when said gaseous medium is thus ionized, so that said voltage is sufficiently low to prevent the passage of a breakdown current through the ionized gaseous medium in said gap when the circuit of said source is closed.

7. A switch device according to claim 6, in which one of said terminal members is perforate, said perforate terminal member being located between said mass and the other terminal member when said carrier is in circuit-closing position.

SOLOMON ROSENBLUM.